Feb. 9, 1937. P. E. MACK 2,070,288
HAND OPERATED POWER DRIVEN LAWN MOWER
Filed Feb. 10, 1934
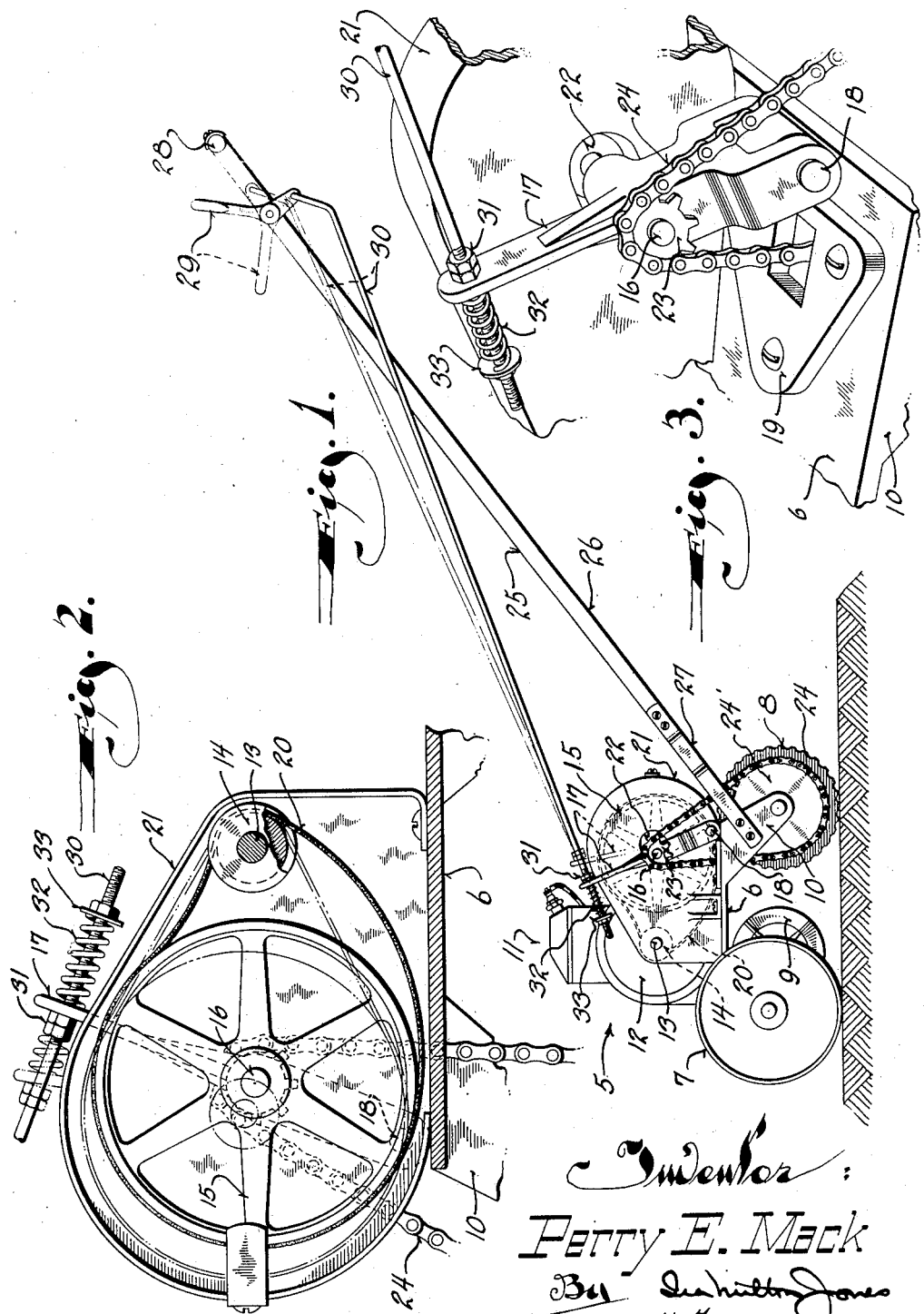
Inventor:
Perry E. Mack

UNITED STATES PATENT OFFICE 2,070,288

HAND OPERATED POWER DRIVEN LAWN MOWER

Perry E. Mack, Milwaukee, Wis., assignor to Briggs & Stratton Corporation, Milwaukee, Wis., a corporation of Delaware Application February 10, 1934, Serial No. 710,663

4 Claims. (Cl. 180—19)

This invention relates to new and useful improvements in hand operated power driven lawn mowers and garden implements.

Devices of this type are provided with clutches for releasably connecting their driving traction members with the power unit. Heretofore, difficulty has been experienced in providing a clutch that would gradually pick up the load without sudden shock, and at the same time afford a strong driving connection and be of simple design. Sudden starting is especially undesirable in lawn mowers as it produces objectionable ruts in the lawn.

It is, therefore, an object of this invention to provide a power driven lawn mower having a clutch of simple construction which may be gradually rendered operative to preclude sudden starting of the driving action.

More specifically, it is an object of this invention to provide a clutch for power driven lawn mowers and the like, which comprises merely a set of pulleys adapted to be drivingly connected by a belt with one of the pulleys so arranged as to place the belt in tension when a driving action is desired and to allow the belt to hang slack when no driving connection is desired.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a side view showing a conventional lawn mower equipped with this invention;

Figure 2 is an enlarged detail view showing the clutch mechanism per se, said view being taken from the inside of the clutch and showing the frame of the motor and the engine drive shaft in section; and Figure 3 is a detail perspective view showing the mechanism for throwing the clutch in and out.

Referring now more particularly to the accompanying drawing, in which like numerals indicate like parts throughout the several views, the numeral 5 designates generally a power driven lawn mower. The lawn mower illustrated comprises a frame 6 mounted on wheels 7, and driving traction wheels or a driving roller 8. The rotary blades 9 are mounted from the frame in the conventional manner and are driven from the wheels 7 as is customary. Legs 10 extend downwardly and rearwardly from the frame and mount the axle of the driving wheels or roller 8.

Supported on the frame is an internal combustion engine 11, or other suitable driving unit, having a fly-wheel 12 and a power take-off shaft 13. Secured to the power take-off shaft 13 is a drive pulley 14. Rearwardly of the drive pulley 14 and in line therewith, is a large idler pulley 15. The pulley 15 is fixed to a stub shaft 16, which is journalled in an arm 17 pivotally mounted by a pin 18 on a bracket 19, secured directly to the frame 6 of the mower. By swinging the arm 17 on its pivotal mounting, the pulley 15 may be moved towards and from the drive pulley 14.

A belt 20, trained about the pulleys 14 and 15 drivingly connects the same when the arm 17 is swung away from the driving pulley 14 to place the belt in tension. When the arm 17 is in its position shown in Figures 1 and 2, the pulleys 14 and 15 being closer together, the belt 20 hangs slack and does not impart driving force to the idler pulley.

The pulleys 14 and 15, with the belt connecting them, are enclosed by a suitable guard housing 21, secured to the frame of the mower, the arm 17 being mounted outside the guard housing, which has an opening 22, through which the stub shaft 16 passes, the opening being sufficiently large to accommodate the movement of the shaft incidental to the swinging of the arm.

On the outer end of the stub shaft 16, there is a driving sprocket 23, which is drivingly connected through a sprocket chain 24, with a sprocket wheel 24' fixed to the axle of the driving wheels or roller 8, so that whenever the idler pulley 15 is driven from the driving pulley 14, a drive connection is established between the engine and the driving wheels or roller 8. One run of the sprocket chain 24 passes through aligned openings in the bracket 19 and the adjacent portion of the mower frame.

It is to be observed that the arm 17 is so mounted that the distance of travel of the stub shaft 16 incidental to the swinging movement of the arm does not affect the tension on the two runs of the sprocket chain. In other words, the distance of travel of the axis of the stub shaft 16 lies half on one side and half on the other side of a plane intersecting the axes of the axle of the driving wheels 8 and pin 18.

To properly guide the mower, a handle 25 is provided. This handle may be of the conventional construction, comprising a shaft 26 attached by arms 27 to the frame of the mower, in the present instance to the legs 10, and carrying at its upper end a cross bar 28. The conventional throttle control (not shown) for the drive motor is mounted on the handle as well as any other controls necessary for regulating the operation of the engine.

A clutch control lever 29 is also pivotally mounted on the upper end of the handle adjacent the cross bar 28, by which the clutch may be thrown in and out. A link 30 connects one arm of the lever 29 with the arm 17. The lower end of the link 30, as illustrated, is threaded and is freely slidably passed through an opening in the upper end of the arm 17. Above the arm 17, jam nuts 31 are rigidly mounted on the link and beneath the arm 17, a compression spring 32, coiled about the extended end of the link is confined between the arm and an adjustable stop 33 carried by the lower end of the link. Hence, it will be seen that as tension is applied to the link 30, the arm 17 will be drawn rearwardly and away from the driving pulley 14 to take up the slack of the driving belt 20.

As the slack of the driving transmission belt 20 is taken up, the spring 32 is compressed and as the application of tension on the link is continued by counter-clockwise movement of the lever 29, as viewed in Figure 1, the point of connection of the link with the lever 29 passes beyond dead center to releasably hold the arm 17 in its operative position with the tension on the belt 20 determined by the compression adjustment of the spring 32.

Declutching requires merely the movement of the lever 29 to its position illustrated in full lines in Figure 1.

From the foregoing description taken in connection with the accompanying drawing, it will be readily apparent to those skilled in the art, that this invention affords a simple but effective clutch mechanism for power driven lawn mowers and similar equipment and that the clutch is so constructed that the driving force may be gradually applied to entirely obviate the heretofore objectionable feature of sudden starting. It is also apparent that while in the embodiment shown only a single clutch is utilized, and steering is not contemplated through independent driving of two traction wheels, the duplication of the entire unit at opposite sides of the mower to afford such independent driving action, comes clearly within the spirit of this invention.

What I claim as my invention is:

1. In a power driven implement of the character described including a drive motor and a ground engaging traction member, a releasable driving connection capable of being gradually rendered operative to drivingly connect the motor and the traction member, said driving connection including a pivoted member to be swung to a predetermined position to render the driving connection operative, a handle for the implement, a lever pivoted on the handle, a link attached to the lever at one end, a spring connecting the other end of the link with said pivoted member, whereby actuation of the lever applies the force of the spring to the pivoted member and therethrough to the driving connection to render the same operative, and said link being so connected to the lever with respect to the pivotal mounting of the lever that its point of connection to the lever passes beyond dead center and releasably holds the pivoted member in its operative position.

2. A releasable driving connection between the motor and the traction member of a power driven hand controlled implement having a handle by which the implement is guided, comprising a drive pulley driven by the motor, an idler pulley in line with the drive pulley, a flexible transmission element to drivingly connect said pulleys, a pivoted arm mounting the idler pulley for movement toward and away from the drive pulley, means to drivingly connect the idler pulley and the traction member, a spring connected with the pivoted arm, and means operable from a point on the handle to tense the spring and swing said pivoted arm and gradually move the idler pulley away from the driving pulley and place the flexible transmission element in tension by the force of the spring acting through the pivoted arm to gradually effect a driving connection between the pulleys.

3. In a motor driven hand controlled implement of the character described, the combination of ground engaging wheels, a ground engaging driving traction roller, a deck supported on and connecting said ground engaging wheels and traction roller, a motor mounted on the deck with its crank shaft disposed substantially above the ground engaging wheels, a handle extending rearwardly from the deck, a countershaft, means for movably mounting the countershaft from the deck in a position substantially horizontally in line with the motor crank shaft and substantially disposed over the driving traction roller, said movable mounting for the countershaft accommodating movement of the countershaft toward and away from the motor crank shaft while maintaining substantially the same distance from the axis of the driving traction roller, a chain drive permanently drivingly connecting the countershaft with the driving traction roller, a belt drive for drivingly connecting the countershaft with the motor crank shaft, said belt drive being ineffective except when taut, and manually controlled means upon the handle for moving the countershaft away from the motor crank shaft by a pull transmitted through such manually controlled means in the direction of extension of the handle to tighten the belt drive and establish a driving connection between the motor and the driving traction roller.

4. In a motor driven hand controlled implement vehicle of the character described, the combination of supporting wheels, a ground engaging traction roller, a deck supported on and connecting said ground engaging wheels and traction roller, a motor mounted on the deck, a handle extending rearwardly from the deck, a countershaft, means drivingly connecting the countershaft with the traction roller, a belt drive between the motor and the countershaft, a movable bearing means mounting the countershaft and adapted to move the same forward and backward, said means loosening and tightening the belt drive without affecting the driving connection between the countershaft and the traction roller, a hand lever upon the handle, and a link and spring connection between the hand lever and the movable bearing means, the hand lever and the link being so arranged that a pull on the hand lever rearwardly moves the bearing in a direction to slacken the belt drive and stop the vehicle, and a push forwardly on the hand lever actuates the spring and link connection to move the bearing means in a direction to tense the belt drive and affect the driving connection from the motor to the traction roller so as to drive the vehicle forward in the direction indicated by the motion of the hand lever.

PERRY E. MACK.